Patented Aug. 12, 1924.

1,504,340

UNITED STATES PATENT OFFICE.

WALTER GLAESER, OF BROOKLYN, NEW YORK.

MANUFACTURE OF MONOSODIUM PHOSPHATE.

No Drawing.    Application filed April 12, 1922. Serial No. 551,917.

*To all whom it may concern:*

Be it known that I, WALTER GLAESER, a citizen of the United States, and a resident of Brooklyn, county of Kings, and State of New York, have invented a new and useful Improvement in the Manufacture of Monosodium Phosphate, of which the following is a specification, the principle of the invention being herein explained and the best mode in which I have contemplated applying that principle, so as to distinguish it from other inventions.

The present invention relates to a new and improved method of manufacturing mono-sodium phosphate using either phosphate rock or dicalcium phosphate or any similar phosphatic material as a base material from which the mono-sodium phosphate is produced. To the accomplishment of the foregoing and related ends, the said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

In carrying out the present invention, phosphate rock, dicalcium phosphate, or a similar phosphatic material is reacted upon by sulphuric acid and water sufficient in amount to produce mono-calcium phosphate according to the well known reaction:

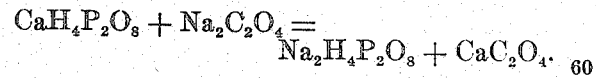

The above reaction may be desirably carried out in a suitable tank which is equipped with a stirring or agitating apparatus, and also with heating means such, for example, as a steam coil, in order that the mixture may be warmed to facilitate the reaction. Heat, however, is not necessary and particularly when dicalcium phosphate is employed.

After the completion of the above reaction the calcium sulphate is removed by filtration and washed with water until entirely free from mono-calcium phosphate. The filtrate and the wash water are then united and a solution of sodium oxalate is added which reacts upon the mono-calcium phosphate with the production of mono-sodium phosphate and calcium oxalate in accordance with the following equation:

The solution containing the mono-sodium phosphate may then be evaporated and the mono-sodium phosphate recovered in the usual manner, that is, either in the solid form or it may be changed to disodium phosphate by the addition of sodium carbonate solution.

The calcium oxalate may then be treated with boiling sodium carbonate solution to convert it to neutral sodium oxalate according to the equation:

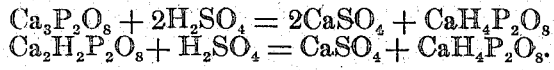

The resulting sodium oxalate may then be reintroduced into the process.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making mono-sodium phosphate, the steps which consist in treating phosphate containing material with sulphuric acid and water to produce mono-calcium phosphate and then converting the mono-calcium phosphate formed to mono-sodium phosphate by the addition of sodium oxalate.

2. In a method of making mono-sodium phosphate, the steps which consist in reacting upon a phosphate containing material with sulphuric acid and water while maintaining the mixture in agitated condition, reacting upon the mono-calcium phosphate with sodium oxalate to produce mono-sodium phosphate, and then separating the mono-sodium phosphate formed from the calcium oxalate by filtration.

Signed by me, this 6th day of April, 1922.

WALTER GLAESER.